US012658804B2

(12) United States Patent
Zhang et al.

(10) Patent No.: US 12,658,804 B2
(45) Date of Patent: Jun. 16, 2026

(54) TRANS-INDUCTOR VOLTAGE REGULATOR WITH AVERAGE CURRENT SENSING AND CORRECTION

(71) Applicant: Chengdu Monolithic Power Systems Co., Ltd., Chengdu (CN)

(72) Inventors: Fangyu Zhang, Hangzhou (CN); Ming Chen, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 202 days.

(21) Appl. No.: 18/734,429

(22) Filed: Jun. 5, 2024

(65) Prior Publication Data

US 2024/0413732 A1 Dec. 12, 2024

(30) Foreign Application Priority Data

Jun. 9, 2023 (CN) .......................... 202310684396.5

(51) Int. Cl.
*H02M 3/158* (2006.01)
*H02M 1/00* (2007.01)
(52) U.S. Cl.
CPC ....... *H02M 3/1584* (2013.01); *H02M 1/0009* (2021.05); *H02M 3/158* (2013.01)
(58) Field of Classification Search
CPC ... H02M 1/0009; H02M 3/158; H02M 3/1584
See application file for complete search history.

(56) References Cited

U.S. PATENT DOCUMENTS

| | | | |
|---|---|---|---|
| 7,791,321 B2 * | 9/2010 | Xu ...................... | H02M 3/1584 |
| | | | 323/361 |
| 11,303,204 B1 * | 4/2022 | Zhao ................... | H02M 3/1588 |
| 11,451,145 B2 | 9/2022 | Shao et al. | |
| 11,476,763 B2 * | 10/2022 | Chang .................. | H02M 3/003 |
| 11,641,163 B2 | 5/2023 | Capetillo | |
| 2023/0299687 A1 | 9/2023 | Shao et al. | |

* cited by examiner

*Primary Examiner* — Jue Zhang
(74) *Attorney, Agent, or Firm* — Perkins Coie LLP

(57) ABSTRACT

A multiphase power supply has an input terminal, an output terminal, a plurality of transformers, a plurality of switching circuits, and a control circuit. Secondary windings of the plurality of transformers are coupled in series with a compensation inductor. The plurality of switching circuits are coupled in parallel between the input terminal and the output terminal. Each of the plurality of switching circuits is coupled to the output terminal via a primary winding of a corresponding transformer. The control circuit senses an average current flowing through the plurality of switching circuits and a current flowing through the compensation inductor respectively, and corrects a sensing result of the average current based on the current flowing through the compensation inductor. The control circuit further provides a plurality of pulse width modulation signals based on the output voltage and the corrected sensing result to control the plurality of switching circuits.

20 Claims, 11 Drawing Sheets

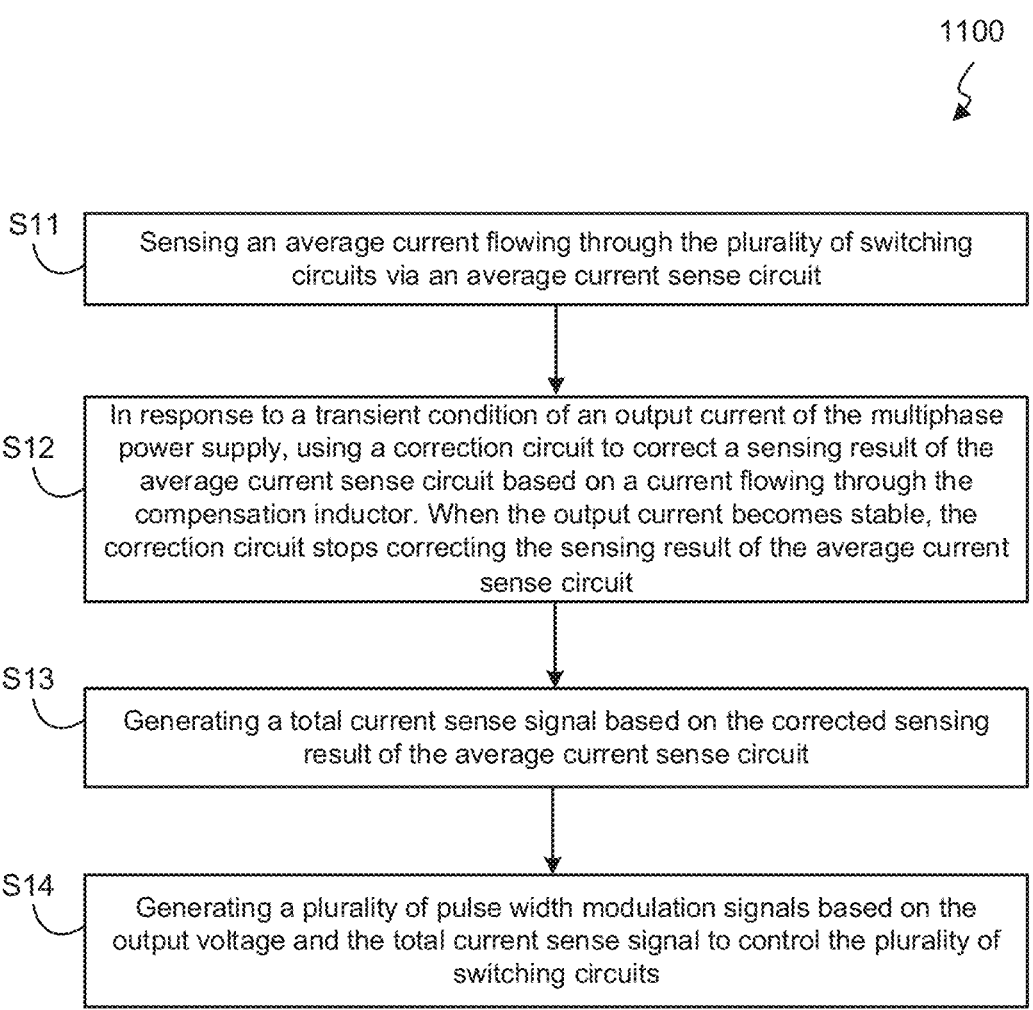

1100

S11　Sensing an average current flowing through the plurality of switching circuits via an average current sense circuit S12　In response to a transient condition of an output current of the multiphase power supply, using a correction circuit to correct a sensing result of the average current sense circuit based on a current flowing through the compensation inductor. When the output current becomes stable, the correction circuit stops correcting the sensing result of the average current sense circuit S13　Generating a total current sense signal based on the corrected sensing result of the average current sense circuit S14　Generating a plurality of pulse width modulation signals based on the output voltage and the total current sense signal to control the plurality of switching circuits

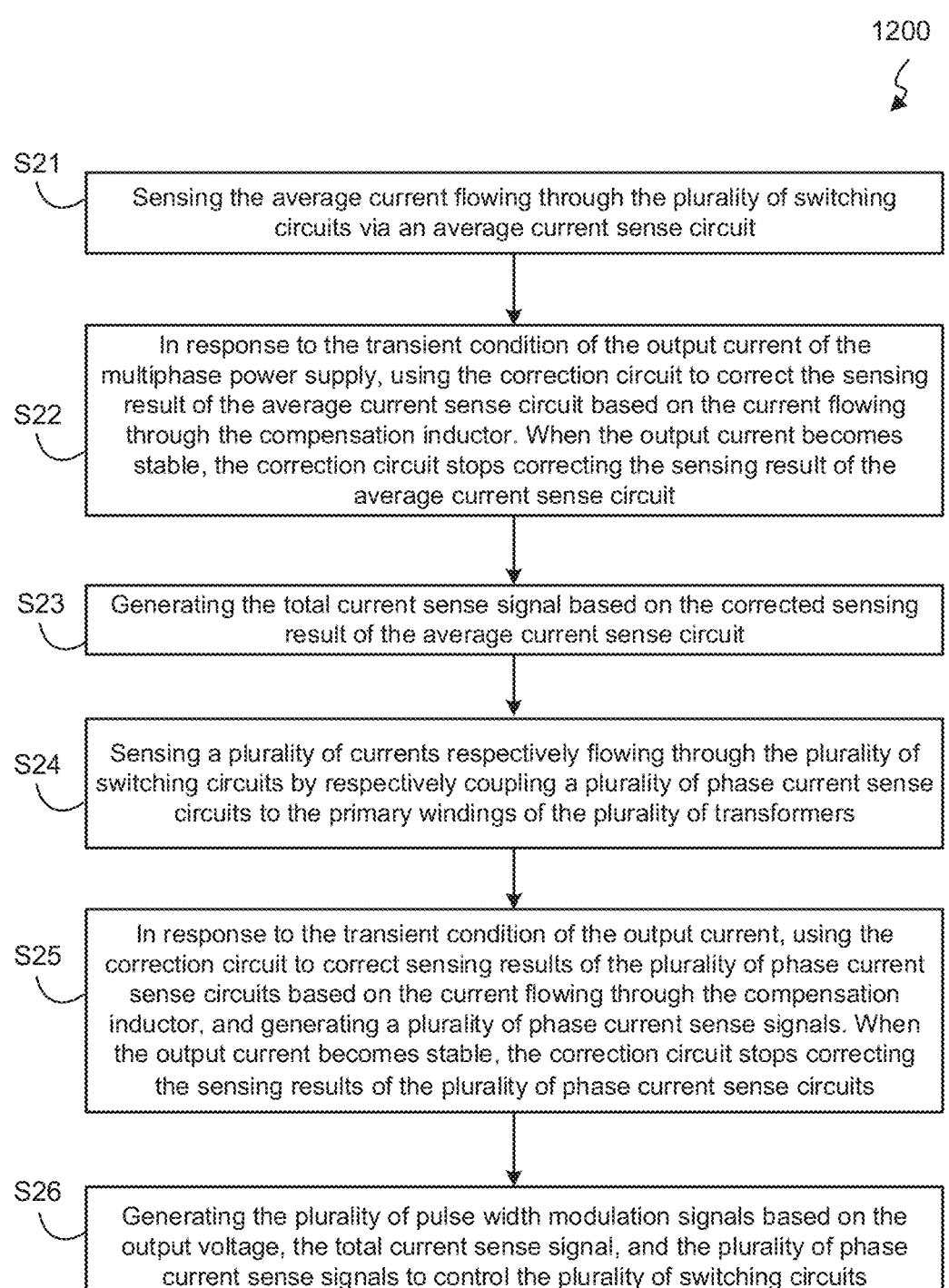

S21 — Sensing the average current flowing through the plurality of switching circuits via an average current sense circuit S22 — In response to the transient condition of the output current of the multiphase power supply, using the correction circuit to correct the sensing result of the average current sense circuit based on the current flowing through the compensation inductor. When the output current becomes stable, the correction circuit stops correcting the sensing result of the average current sense circuit S23 — Generating the total current sense signal based on the corrected sensing result of the average current sense circuit S24 — Sensing a plurality of currents respectively flowing through the plurality of switching circuits by respectively coupling a plurality of phase current sense circuits to the primary windings of the plurality of transformers S25 — In response to the transient condition of the output current, using the correction circuit to correct sensing results of the plurality of phase current sense circuits based on the current flowing through the compensation inductor, and generating a plurality of phase current sense signals. When the output current becomes stable, the correction circuit stops correcting the sensing results of the plurality of phase current sense circuits S26 — Generating the plurality of pulse width modulation signals based on the output voltage, the total current sense signal, and the plurality of phase current sense signals to control the plurality of switching circuits

FIG. 12

TRANS-INDUCTOR VOLTAGE REGULATOR WITH AVERAGE CURRENT SENSING AND CORRECTION

CROSS-REFERENCE TO RELATED APPLICATIONS

This application claims the benefit of CN application No. 202310684396.5, filed on Jun. 9, 2023, and incorporated herein by reference.

BACKGROUND OF THE INVENTION

1. Field of the Invention

The present invention generally refers to electrical circuits, and more particularly but not exclusively refers to trans-inductor voltage regulators.

2. Description of Related Art

A trans-inductor voltage regulator (TLVR) is a type of voltage regulator that uses a primary winding of a transformer as an output inductor. In a multiphase TLVR, the secondary windings of the transformers of all the phases are connected in a series loop to ground. Because of the series connection of the secondary windings, all of the phases are able to respond to a change in load current, allowing for a faster transient response compared to other voltage regulator topology.

A TLVR may employ constant ON-time current-mode control to generate and maintain its output voltage at a regulated level. Current mode control involves using a sensed current, which is indicative of the current flowing through the output inductor, as part of the constant ON-time current-mode control loop. A multiphase TLVR may utilize a separate sensed current for each phase or an average sensed current for all phases. The sensed current may be generated by using a sense resistor, using the direct current resistance (DCR) of the output inductor, or some other way to sense the current through the output inductor.

SUMMARY OF THE INVENTION

It is one of the objects of the present invention to provide multiphase power supply, control circuit, and associated control method.

Embodiments of the present invention are directed to a control circuit for a multiphase power supply. The multiphase power supply comprises a plurality of transformers and a compensation inductor coupled in series with secondary windings of the transformers. The control circuit comprises a controller, an average current sense circuit, and a correction circuit. The controller has a first current sense terminal, a second current sense terminal, and a plurality of switching control terminals. Based on an output voltage of the multiphase power supply and a signal between the first current sense terminal and the second current sense terminal, the controller is configured to provide a plurality of pulse width modulation signals respectively at the plurality of switching control terminals to control a plurality of switching circuits of the multiphase power supply. The average current sense circuit is configured to be coupled to a primary winding of each of the plurality of transformers to sense an average current flowing through the plurality of switching circuits. The average current sense circuit comprises an average sensing capacitor with a first end coupled to the first current sense terminal and a second end coupled to the second current sense terminal. The correction circuit is configured the be coupled to the compensation inductor. The correction circuit comprises a correction capacitor with a first end coupled to a first end of the compensation inductor and a second end coupled to the second current sense terminal. The correction circuit is configured to inject information obtained from the compensation inductor into the second current sense terminal in response to a transient condition of an output current of the multiphase power supply.

Embodiments of the present invention are directed to a multiphase power supply comprising an input terminal, an output terminal, a plurality of transformers, a plurality of switching circuits, and a control circuit. The input terminal is configured to receive an input voltage, and the output terminal is configured to receive an output voltage. Secondary windings of the plurality of transformers are coupled in series with a compensation inductor. The plurality of switching circuits are coupled in parallel between the input terminal and the output terminal of the multiphase power supply. Each of the plurality of switching circuits is coupled to the output terminal of the multiphase power supply via a primary winding of a corresponding transformer. The control circuit is configured to sense an average current flowing through the plurality of switching circuits and a current flowing through the compensation inductor respectively, and to provide a plurality of pulse width modulation signals to control the plurality of switching circuits. The control circuit is further configured to correct a sensing result of the average current flowing through the plurality of switching circuits based on the current flowing through the compensation inductor, and to provide the plurality of pulse width modulation signals based on the output voltage and the corrected sensing result of the average current flowing through the plurality of switching circuits.

Embodiments of the present invention are directed to a control method for a multiphase power supply. The multiphase power supply comprises a plurality of transformers and a compensation inductor coupled in series with secondary windings of the transformers. The control method comprises sensing an average current flowing through a plurality of switching circuits of the multiphase power supply via an average current sense circuit, using a correction circuit to correct a sensing result of the average current sense circuit based on a current flowing through the compensation inductor in response to a transient condition of an output current of the multiphase power supply, generating a total current sense signal based on the corrected sensing result of the average current sense circuit, and generating a plurality of pulse width modulation signals based on the output voltage and the total current sense signal to control the plurality of switching circuits.

These and other features of the present invention will be readily apparent to persons of ordinary skill in the art upon reading the entirety of this disclosure, which includes the accompanying drawings and claims.

BRIEF DESCRIPTION OF DRAWINGS

The present invention can be further understood with reference to the following detailed description and the appended drawings, wherein like elements are provided with like reference numerals.

FIG. 11 illustrates a control method 1100 for a multiphase power supply in accordance with an embodiment of the present invention.

FIG. 12 illustrates a control method 1200 for the multiphase power supply in accordance with an embodiment of the present invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
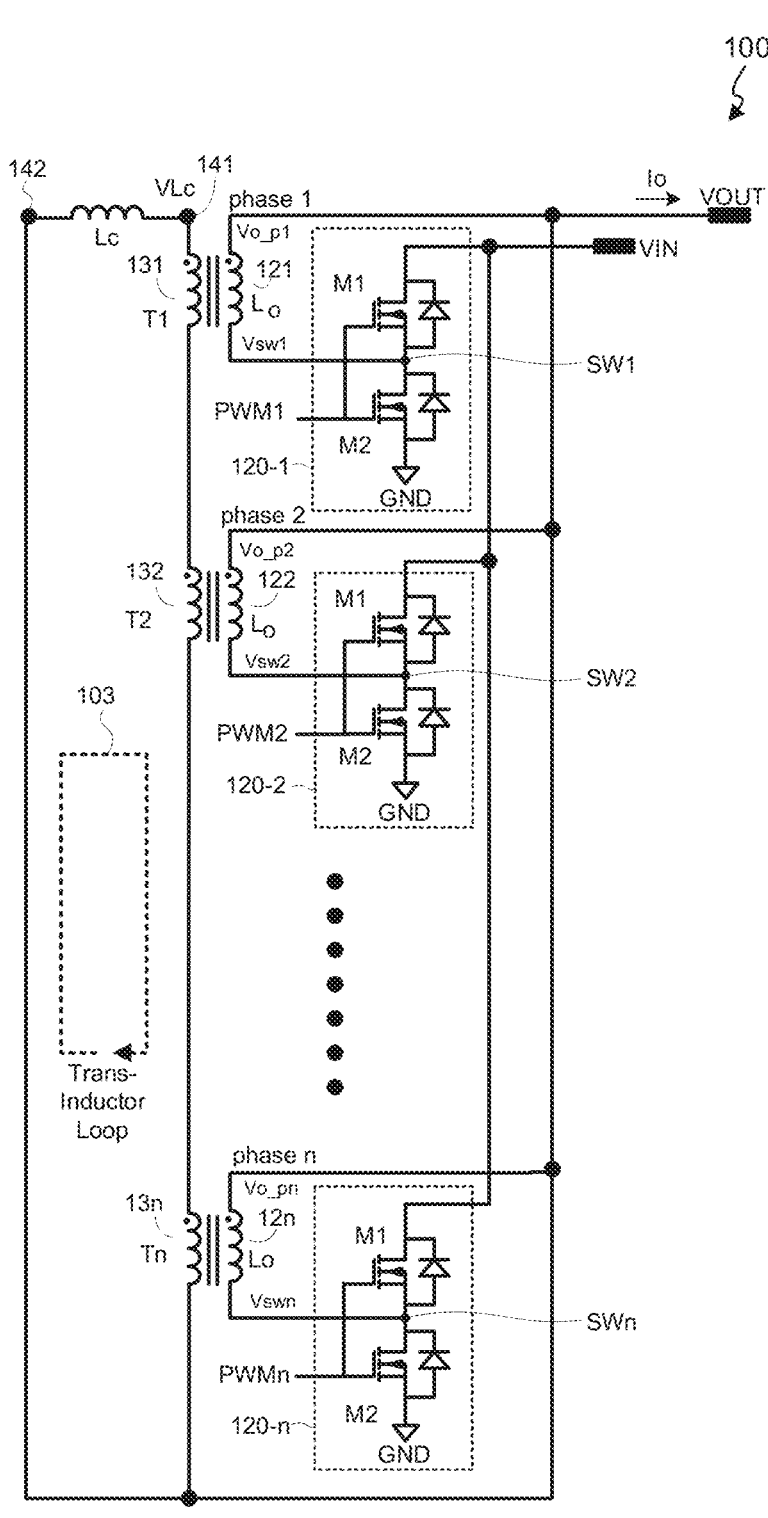
FIG. 1 schematically shows a circuit diagram of a power stage 100 for a multiphase power supply in accordance with an embodiment of the present invention.

FIG. 1 schematically shows a circuit diagram of a power stage 100 for a multiphase power supply in accordance with an embodiment of the present invention. The power stage 100 comprises a trans-inductor voltage regulator (TLVR), e.g., as shown in FIG. 1, the power stage 100 comprises an input terminal to receive an input voltage VIN, an output terminal to provide an output voltage VOUT, a plurality of transformers T1-Tn, a plurality of switching circuits 120 (i.e., 120-1, 120-2, . . . , and 120-n, wherein n is natural number greater than 1) coupled in parallel between the input voltage VIN and the output voltage VOUT, and a compensation inductor Lc. The power stage 100 provides the output voltage VOUT and an output current Io to a load (not shown in FIG. 1). Each of the plurality of switching circuits 120 provides one phase of the power stage 100. In the example of FIG. 1, the switching circuit 120-1 provides a first phase of the power stage 100, the switching circuit 120-2 provides a second phase of the power stage 100, and so forth. Each of the plurality of switching circuits 120 comprises at least one switch controlled by a corresponding pulse width modulation signal PWM, e.g., the at least one switch of the switching circuit 120-1 is controlled by a pulse width modulation signal PWM1, the at least one switch of the switching circuit 120-2 is controlled by a pulse width modulation signal PWM2, and the at least one switch of the switching circuit 120-n is controlled by a pulse width modulation signal PWMn.

In the embodiment of FIG. 1, each of the plurality of switching circuits 120 comprises a high side switch M1 and a low side switch M2, with each of the high side switch M1 and the low side switch M2 having a first terminal and a second terminal. The first terminal of the high side switch M1 is coupled to the input voltage VIN, the second terminal of the high side switch M1 is coupled to the first terminal of the low side switch M2 to form a switch node, and the second terminal of the low side switch M2 is coupled to a reference ground GND. For example, the second terminal of the high side switch M1 of the switching circuit 120-1 is coupled to the first terminal of the low side switch M2 of the switching circuit 120-1 to form the switch node SW1, the second terminal of the high side switch M1 of the switching circuit 120-2 is coupled to the first terminal of the low side switch M2 of the switching circuit 120-2 to form the switch node SW2, and the second terminal of the high side switch M1 of the switching circuit 120-n is coupled to the first terminal of the low side switch M2 of the switching circuit 120-n to form the switch node SWn. Each of the high side switches M1 and the low side switches M2 further has a control terminal to receive the corresponding pulse width modulation signal PWM. For example, the high side switch M1 and the low side switch M2 of the switching circuit 120-1 are turned ON and OFF by the pulse width modulation signal PWM1, the high side switch M1 and the low side switch M2 of the switching circuit 120-2 are turned ON and OFF by the pulse width modulation signal PWM2, and the high side switch M1 and the low side switch M2 of the switching circuit 120-2 are turned ON and OFF by the pulse width modulation signal PWMn. In one example, each of the high side switches M1 and the low side switches M2 may comprise a metal oxide semiconductor field effect transistor (MOSFET), a bipolar transistor, or other type of transistor.

In the example of FIG. 1, each of the plurality of transformers T1-Tn has a first winding and a second winding, wherein the first windings 121-12n of the plurality of transformers T1-Tn are also referred to as primary windings, and the second windings 131-13n of the plurality of transformers T1-Tn are also referred to as secondary windings. Each of the plurality of transformers T1-Tn may have a primary to secondary turns ratio of 1:1, for example. Each of the plurality of switching circuits 120 employs the primary winding of a corresponding transformer as an output inductor Lo which is coupled to the output voltage VOUT. The primary winding of each of the plurality of transformers T1-Tn has a switch node terminal (i.e., Vsw1, Vsw2, . . . , and Vswn) coupled to a corresponding switch node, and has an output voltage terminal (i.e., Vo_p1, Vo_p2, . . . , and Vo_pn) coupled to the output voltage VOUT. For example, the switch node terminal Vsw1 of the primary winding 121 of the transformer T1 is coupled to the switch node SW1, and the output voltage terminal Vo_p1 of the primary winding 121 of the transformer T1 is coupled to the output voltage VOUT. The switch node terminal Vsw2 of the primary winding 122 of the transformer T2 is coupled to the switch node SW2, and the output voltage terminal Vo_p2 of the primary winding 122 of the transformer T2 is coupled to the output voltage VOUT. The switch node terminal Vswn of the primary winding 12n of the transformer Tn is coupled to the switch node SWn, and the output voltage terminal Vo_pn of the primary winding 12n of the transformer Tn is coupled to the output voltage VOUT. A trans-inductor loop 103 is formed by coupling the compensation inductor Lc in series with the secondary windings 131-13n of the plurality of transformers T1-Tn. The trans-inductor loop 103 is coupled to the output voltage VOUT. As shown in FIG. 1, the compensation inductor Lc has a compensation voltage terminal 141 (also marked as VLc in FIG. 1) and a reference terminal 142. The compensation voltage terminal 141 is coupled to the secondary winding 131 of the transformer T1, and the reference terminal 142 is coupled to the output voltage VOUT and the secondary winding 13n of the transformer Tn. In the embodiment shown in FIG. 1, each of the plurality of transformers T1-Tn has one primary winding and one secondary winding as an example, and one with ordinary skill in the art should understand that in the embodiment of the present invention, each of the plurality of transformers T1-Tn may also have a plurality of primary windings and/or a plurality of secondary windings.

Figure 2:
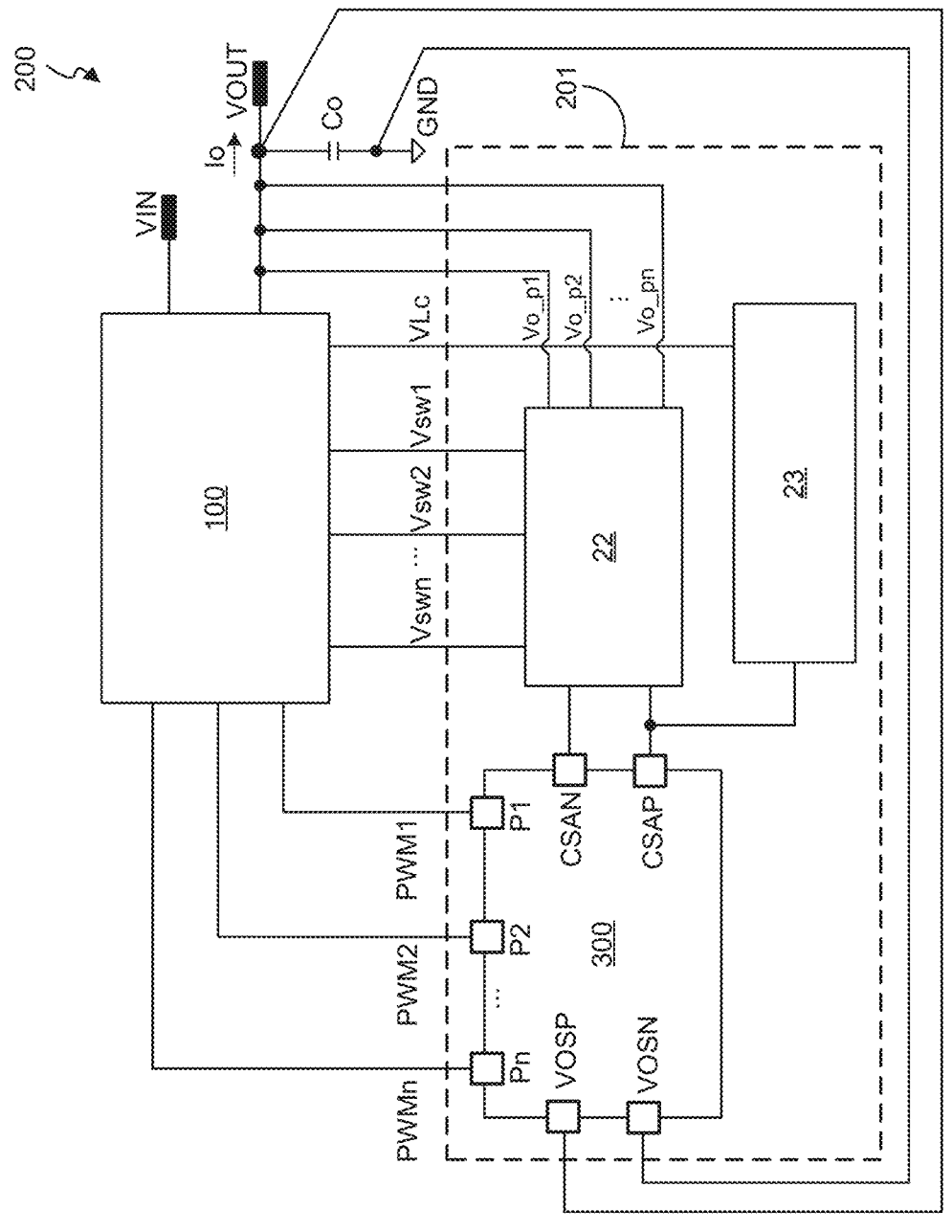
FIG. 2 schematically shows a circuit diagram of a multiphase power supply 200 in accordance with an embodiment of the present invention.

FIG. 2 schematically shows a circuit diagram of a multiphase power supply 200 in accordance with an embodiment of the present invention. The multiphase power supply 200 comprises an input terminal to receive the input voltage VIN, an output terminal to provide the output voltage VOUT, the power stage 100, and a control circuit 201. The control circuit 201 comprises a controller 300, an average current sense circuit 22, and a correction circuit 23. An output capacitor Co is coupled between the output terminal of the multiphase power supply 200 and the reference ground GND. In one embodiment, a detailed circuit of the power stage 100 is shown in FIG. 1. The controller 300 comprises a current sense terminal CSAN, a current sense terminal CSAP, and a plurality of switching control terminals P1-Pn. The controller 300 provides the plurality of pulse width modulation signals PWM1-PWMn at the plurality of switching control terminals P1-Pn based on the output voltage VOUT and a signal between the current sense terminal CSAN and the current sense terminal CSAP, to control the plurality of switching circuits 120 of the power stage 100. In some embodiments, the signal between the current sense terminal CSAN and the current sense terminal CSAP may comprise a voltage across the current sense terminal CSAN and the current sense terminal CSAP, or a current flowing from one of the current sense terminals CSAN and CSAP to the other. In one embodiment, the controller 300 further comprises a voltage sense terminal VOSP and a voltage sense terminal VOSN to sense the output voltage VOUT, wherein the voltage sense terminals VOSN and VOSP are respectively coupled to two ends of the output capacitor Co. One with ordinary skill in the art should understand that the multiphase power supply 200 may also comprise any other suitable circuit (e.g., a voltage divider circuit) to sense the output voltage VOUT.

The average current sense circuit 22 is coupled to the two terminals of the primary winding of each transformer of the power stage 100, to provide a total current flowing through the plurality of switching circuits 120 by sensing an average current flowing through the plurality of switching circuits 120. For example, the average current sense circuit 22 is coupled to the switch node terminal Vsw1 and the output voltage terminal Vo_p1 of the primary winding 121, the switch node terminal Vsw2 and the output voltage terminal Vo_p2 of the primary winding 122, . . . , and the switch node terminal Vswn and the output voltage terminal Vo_pn of the primary winding 12n. The average current sense circuit 22 is further coupled to the current sense terminals CSAN and CSAP of the controller 300 to provide information indicating the average current flowing through the plurality of switching circuits 120. The correction circuit 23 is coupled to the compensation inductor Lc to sense a current flowing through the compensation inductor Lc, and is coupled to the current sense terminal CSAP of the controller 300 to inject information obtained from the compensation inductor Lc into the current sense terminal CSAP to correct a sensing result of the average current sense circuit 22. In one embodiment, the correction circuit 23 corrects the sensing result of the average current sense circuit 22 in response to a transient condition of the output current Io. For example, the transient condition occurs when there is a sudden increase or decrease of the output current Io. When the output current Io is stable, the correction circuit 23 does not correct the sensing result of the average current sense circuit 22. In the example of FIG. 2, the correction circuit 23 is coupled to the compensation voltage terminal 141 (i.e., Vlc) of the compensation inductor Lc. In another example, the correction circuit 23 is coupled to both the compensation voltage terminal 141 and the reference terminal 142 of the compensation inductor Lc.

Figure 3:
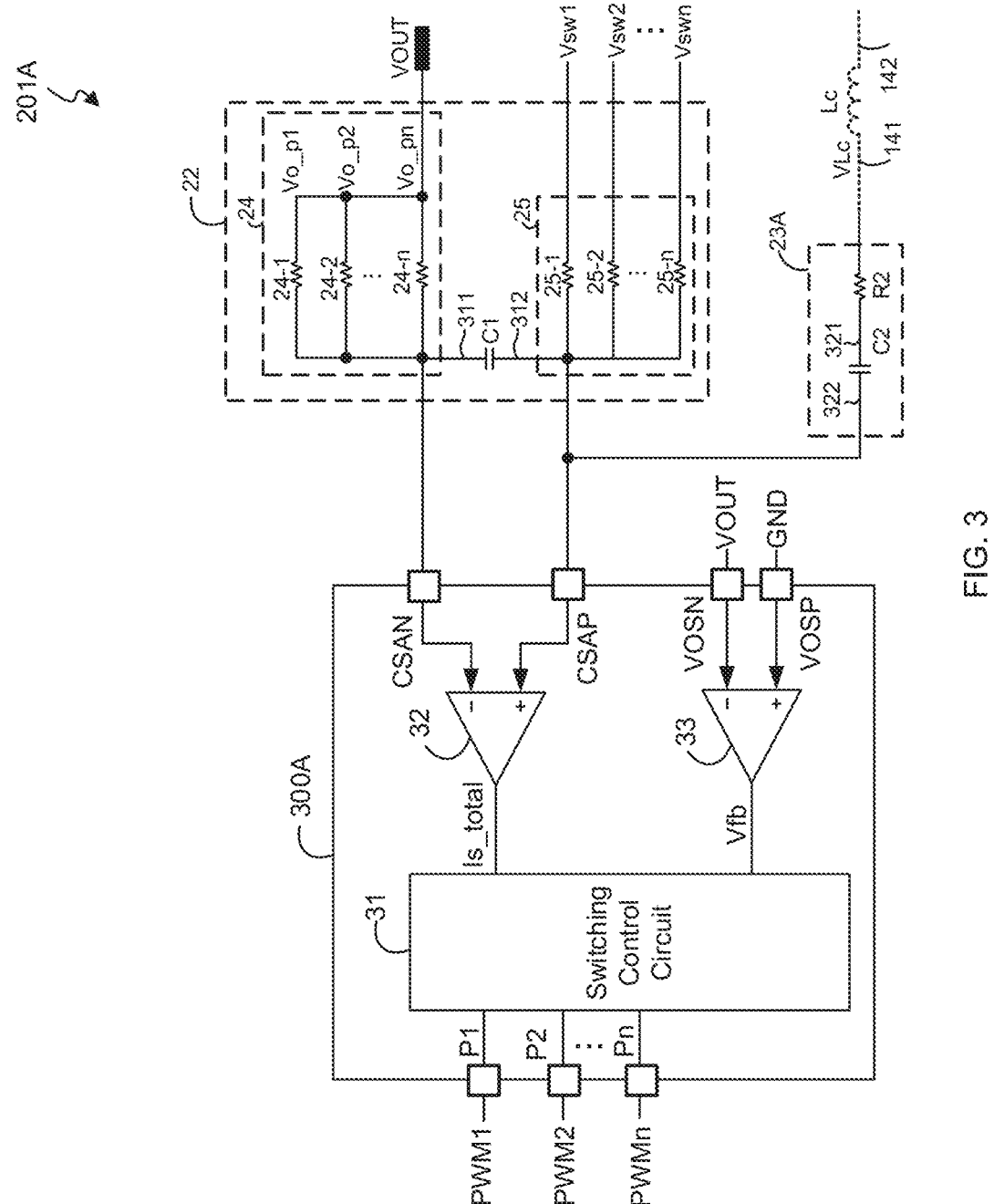
FIG. 3 schematically shows a circuit diagram of a control circuit 201A in accordance with an embodiment of the present invention.

FIG. 3 schematically shows a circuit diagram of control circuit 201A in accordance with an embodiment of the present invention. In the example of FIG. 3, the control circuit 201A comprises the average current sense circuit 22, a correction circuit 23A, and a controller 300A. The average current sense circuit 22 comprises at least an average sensing capacitor C1 coupled between the current sense terminals CSAP and CSAN of the controller 300A. The correction circuit 23A comprises at least a correction capacitor C2 coupled between the current sense terminal CSAP of the controller 300A and the compensation inductor Lc. In the transient condition of the output current Io, the current flowing through the compensation inductor Lc increases rapidly due to features of the power stage 100, and the correction circuit 23A corrects the sensing result of the average current sense circuit 22 based on the current flowing through the compensation inductor Lc to make the signal received by the controller 300 via the current sense terminals CSAP and CSAN accurately reflect the change of the output current Io in real time. When the output current Io is stable, the current flowing through the compensation inductor Lc is close to zero, and the correction circuit 23A does not correct the sensing result of the average current sense circuit 22, and thus make sure that the signal received by the controller 300 via the current sense terminals CSAP and CSAN accurately reflects the average current flowing through the plurality of switching circuits 120 for both the transient condition and a steady state of the output current Io (e.g., when the output current Io is stable).

In the example of FIG. 3, the average current sense circuit 22 further comprises a resistor network 24 and a resistor network 25. The resistor network 24 comprises a plurality of resistors 24-1, 24-2, . . . , and 24-n. Each resistor of the resistor network 24 has an end coupled to a first end 311 of the average sensing capacitor C1, and has another end coupled to the output voltage VOUT via the output voltage terminal of the primary winding of the corresponding transformer. For example, each of the plurality of resistors 24-1, 24-2, . . . , and 24-$n$ has an end coupled to the first end 311 of the average sensing capacitor C1, the resistor 24-1 has another end coupled to the output voltage terminal Vo_p1 of the primary winding 121, the resistor 24-2 has another end coupled to the output voltage terminal Vo_p2 of the primary winding 122, and the resistor 24-$n$ has another end coupled to the output voltage terminal Vo_pn of the primary winding 12$n$. The resistor network 25 comprises a plurality of resistors 25-1, 25-2, . . . , and 25-$n$. Each resistor of the resistor network 25 has an end coupled to a second end 312 of the average sensing capacitor C1, and has another end coupled to the corresponding switch node via the switch node terminal of the primary winding of the corresponding transformer. For example, each of the plurality of resistors 25-1, 25-2, . . . , and 25-$n$ has an end coupled to the second end 312 of the average sensing capacitor C1, the resistor 25-1 has another end coupled to the switch node terminal Vsw1 of the primary winding 121, the resistor 25-2 has another end coupled to the switch node terminal Vsw2 of the primary winding 122, and the resistor 25-$n$ has another end coupled to the switch node terminal Vswn of the primary winding 12$n$. The first end 311 of the average sensing capacitor C1 is coupled to the current sense terminal CSAN, and the second end 312 of the average sensing capacitor C1 is coupled to the current sense terminal CSAP. In the example of FIG. 3, the correction circuit 23A further comprises a resistor R2. The resistor R2 has an end coupled to a first end 321 of the correction capacitor C2, and has another end coupled to the compensation voltage terminal 141 of the compensation inductor Lc. A second end 322 of the correction capacitor C2 is coupled to the current sense terminal CSAP.

The controller 300A comprises a switching control circuit 31, a processing circuit 32 and a processing circuit 33. The processing circuit 32 provides a total current sense signal Is_total based on the signal between the current sense terminal CSAN and the current sense terminal CSAP. The processing circuit 33 provides a voltage feedback signal Vfb based on a signal between the voltage sense terminal VOSP and the voltage sense terminal VOSN. In one embodiment, the processing circuit 32 comprises a differential amplifier having a non-inverted input terminal, an inverted input terminal, and an output terminal, wherein the non-inverted input terminal is coupled to the current sense terminal CSAP of the controller 300A, the inverted input terminal is coupled to the current sense terminal CSAN of the controller 300A, and the output terminal provides the total current sense signal Is_total based on the signal between the current sense terminals CSAN and CSAP. In one embodiment, the processing circuit 33 comprises a differential amplifier having a non-inverted input terminal, an inverted input terminal, and an output terminal, wherein the non-inverted input terminal is coupled to the voltage sense terminal VOSP of the controller 300A, the inverted input terminal is coupled to the voltage sense terminal VOSN of the controller 300A, and the output terminal provides the voltage feedback signal Vfb based on a signal between the voltage sense terminals VOSP and VOSN. The switching control circuit 31 provides the plurality of pulse width modulation signals PWM1-PWMn based on the total current sense signal Is_total and the voltage feedback signal Vfb.

Figure 4:
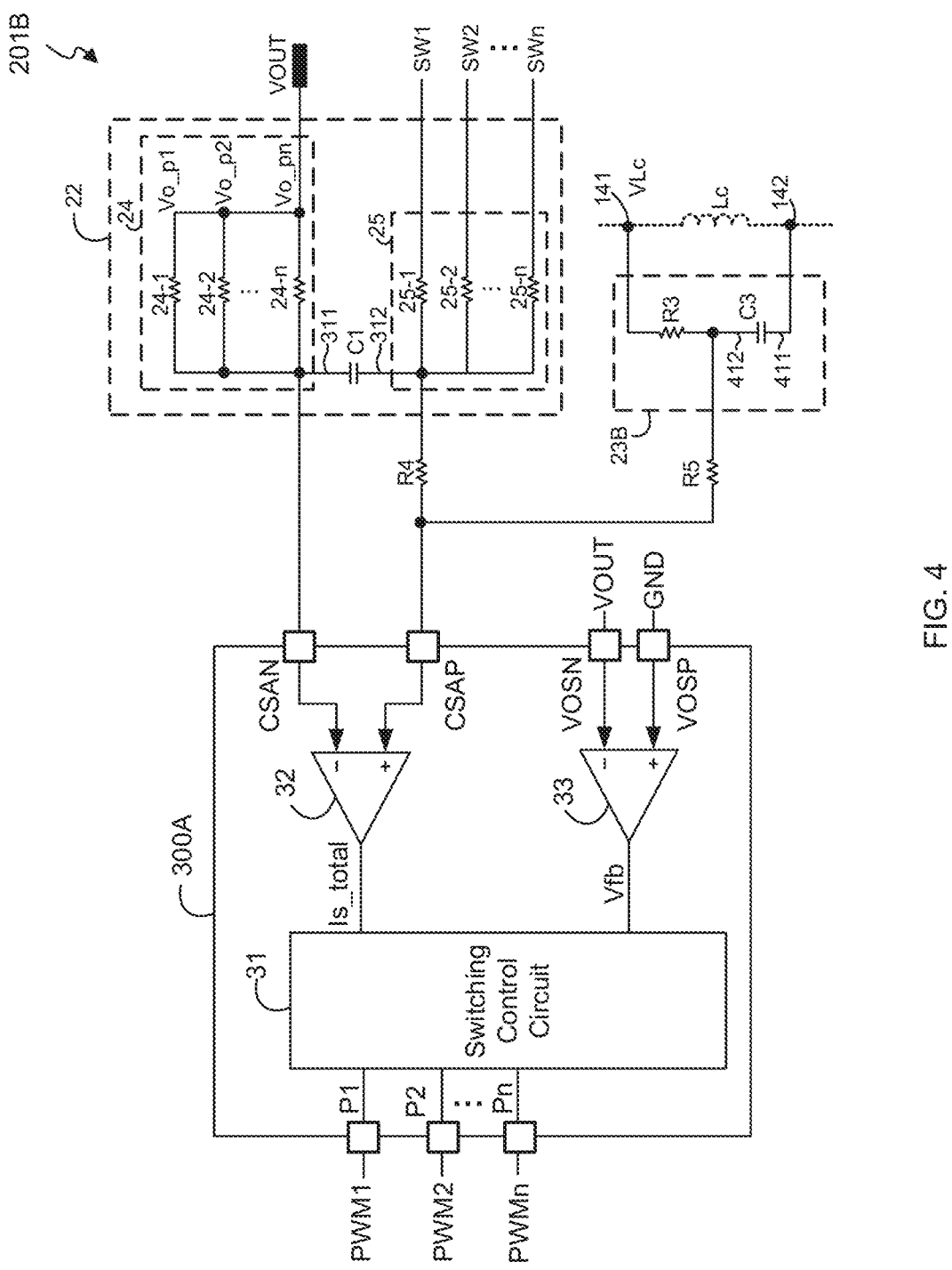
FIG. 4 schematically shows a circuit diagram of a control circuit 201B in accordance with an embodiment of the present invention.

FIG. 4 schematically shows a circuit diagram of a control circuit 201B in accordance with an embodiment of the present invention. The control circuit 201B comprises the average current sense circuit 22, a correction circuit 23B, and a controller 300A. The correction circuit 23B comprises a correction capacitor C3 and a resistor R3. The correction capacitor C3 has a first end 411 coupled to the reference terminal 142 of the compensation inductor Lc, and has a second end 412 coupled to the current sense terminal CSAP. In one embodiment, the second end 312 of the average sensing capacitor C1 is coupled to the current sense terminal CSAP via a resistor R4, and the second end 412 of the correction capacitor C3 is coupled to the current sense terminal CSAP via a resistor R5, i.e., the average current sense circuit 22 and the correction circuit 23B are coupled to the current sense terminal CSAP via different resistors. In one embodiment, resistances of the resistor R4 and the resistor R5 are much larger than resistances of the resistor R3, the resistors 24-1, 24-2, . . . , and 24-$n$, and the resistors 25-1, 25-$n$, . . . , and 25-$n$. In one embodiment, a correction intensity of the correction circuit 23B on the sensing result of the average current sense circuit 22 is set by choosing appropriate resistances for the resistors R4 and R5. The resistor R3 has one end coupled to the second end 412 of the correction capacitor C3, and has another end coupled to the compensation voltage terminal 141 of the compensation inductor Lc.

Figure 5:
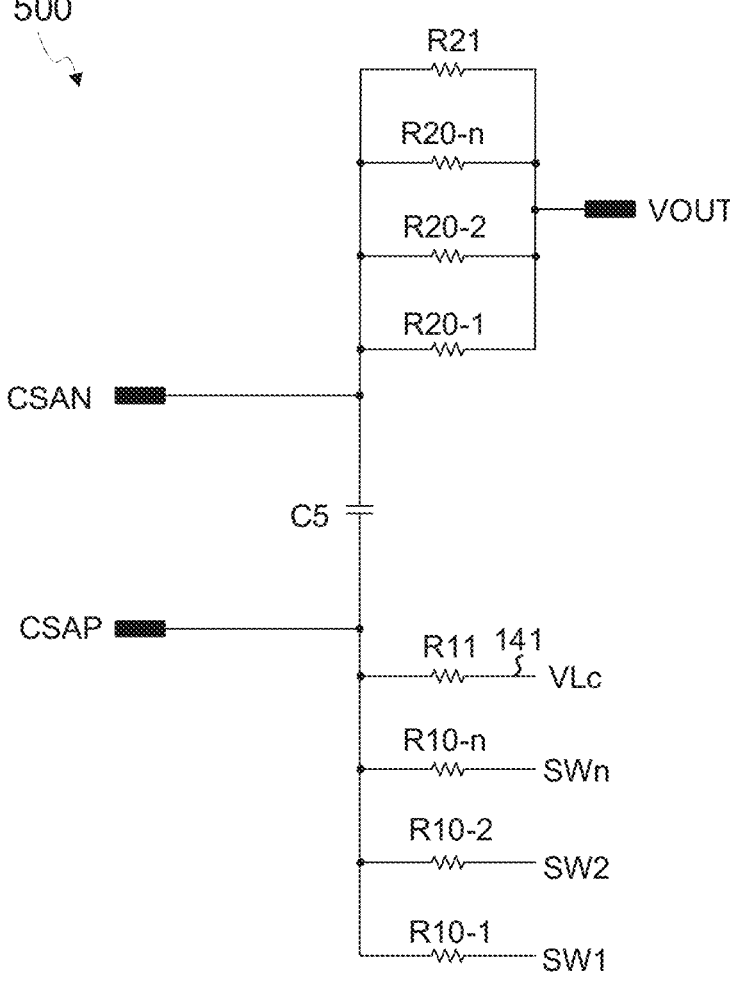
FIG. 5 schematically shows a circuit diagram of a current sense circuit 500.

FIG. 5 schematically shows a circuit diagram of a current sense circuit 500. Different from the embodiments of the present invention shown in FIG. 3 and FIG. 4, the current sense circuit 500 uses a capacitor C5 to sense the average current flowing through the plurality of switching circuits 120 and the current flowing through the compensation inductor Lc. Similarly, the controller 300A provides the total current sense signal Is_total' based on a sensing result of the current sense circuit 500 (i.e., the signal between the current sense terminal CSAN and the current sense terminal CSAP). In the example of FIG. 5, the current sense circuit 500 may be configured to use a resistor R11 to compensate the sensing result in the transient condition of the output current Io. However, after the output current Io becomes stable, the current sense circuit 500 may overcompensate or reversely compensate the sensing result, which causes the sensing result of the current sense circuit 500 to be inaccurate after the output current Io becomes stable.

Figure 6:
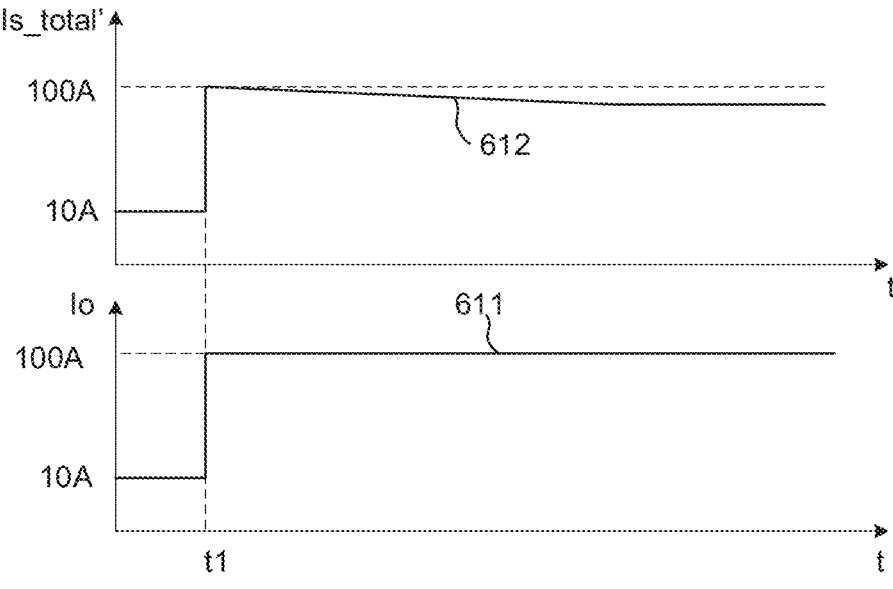
FIG. 6 shows a plot of a total current sense signal Is_total' and a plot of an output current Io based on the current sense circuit 500.

FIG. 6 shows a plot of a current represented by the total current sense signal Is_total' and a plot of the output current Io based on the current sense circuit 500. As shown in FIG. 6, a waveform 611 represents the output current Io, and a waveform 612 represents the current represented by the total current sense signal Is_total'. At time t1, the output current Io increases from 10A to 100A rapidly, and the current represented by the total current sense signal Is_total' increases with the increasing of the output current Io. However, as time progresses, when the output current Io is maintained at 100A, the current represented by the total current sense signal Is_total' gradually deviates the output current Io, e.g., the current represented by the total current sense signal Is_total' gradually becomes smaller than the output current Io and then stabilizes at a current level smaller than the output current Io.

Figure 7:
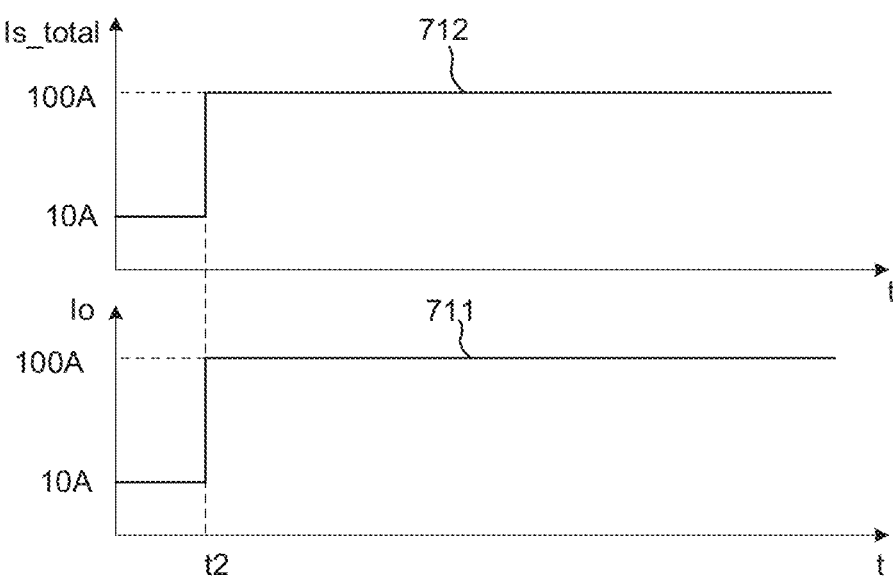
FIG. 7 shows a plot of a total current sense signal Is_total and a plot of the output current Io based on the multiphase power supply 200 in accordance with an embodiment of the present invention.

FIG. 7 shows a plot of a current represented by the total current sense signal Is_total and a plot of the output current Io based on the multiphase power supply 200 in accordance with an embodiment of the present invention. As shown in FIG. 7, a waveform 711 represents the output current Io, and a waveform 712 represents the current represented by the total current sense signal Is_total. At time t2, the output current Io increases from 10A to 100A rapidly, and the current represented by the total current sense signal Is_total increases with the increasing of the output current Io. After the output current Io is maintained at 100A, the current represented by the total current sense signal Is_total still follows the output current Io.

Figure 8:
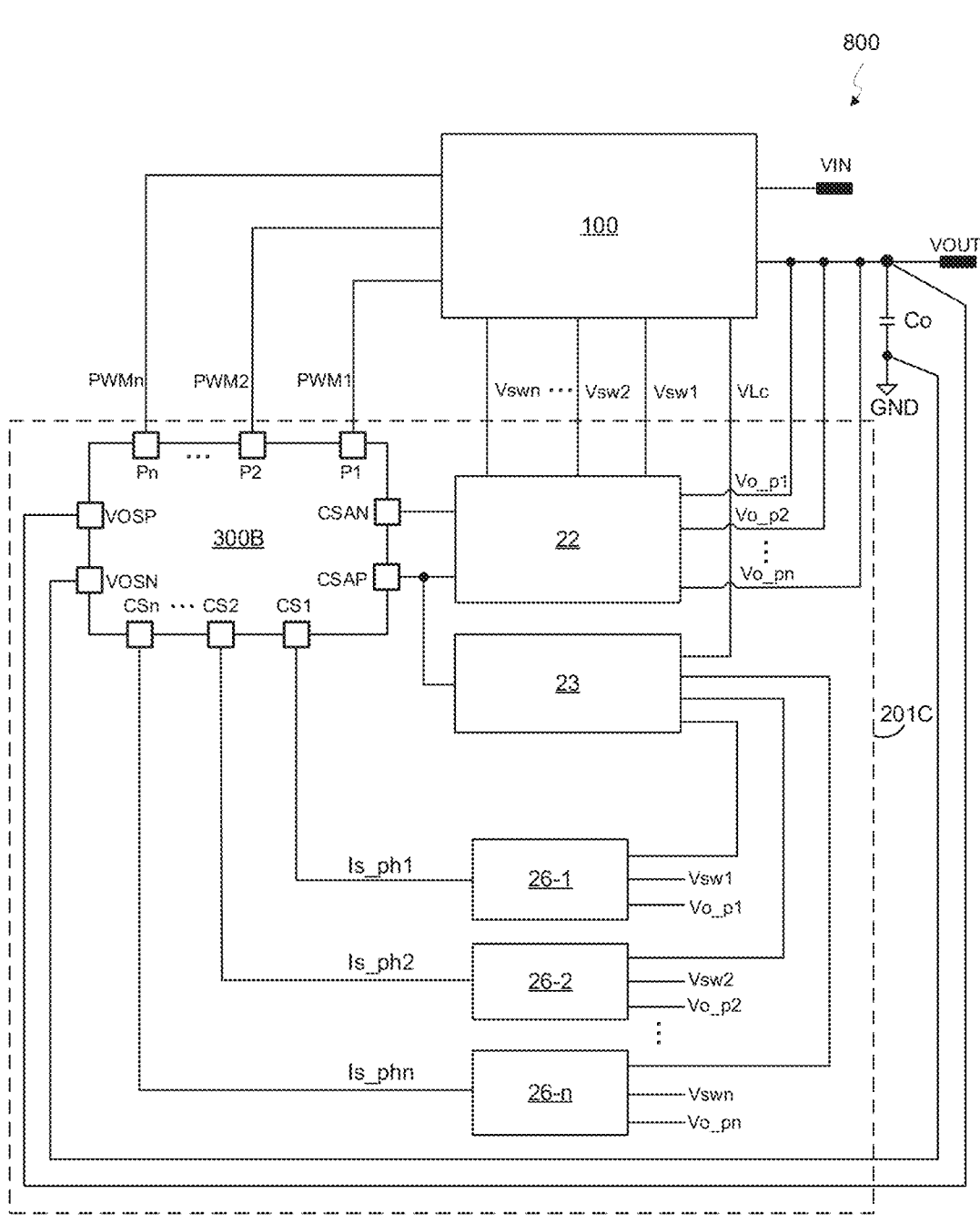
FIG. 8 schematically shows a circuit diagram of a multiphase power supply 800 in accordance with an embodiment of the present invention.

FIG. 8 schematically shows a circuit diagram of a multiphase power supply 800 in accordance with an embodiment of the present invention. The multiphase power supply 800 comprises the power stage 100, and a control circuit 201C having a controller 300B, the average current sense circuit 22, the correction circuit 23, and a plurality of phase current sense circuits 26-1, 26-2, . . . , and 26-*n*. Each of the plurality of phase current sense circuits 26-1, 26-2, . . . , and 26-*n* is configured to sense a current flowing through a corresponding switching circuit, i.e., a phase current. Compared with the embodiment shown in FIG. 2, the controller 300B further comprises phase current sensing terminals CS1, CS2, . . . , and CSn. Each of the plurality of phase current sense circuits 26-1, 26-2, . . . , and 26-*n* is coupled between the two terminals of the primary winding of the corresponding transformer to provide a phase current sense signal to a corresponding phase current sensing terminal of the controller 300B. For example, the phase current sense circuit 26-1 is coupled to the switch node terminal Vsw1 and the output voltage terminal Vo_p1 of the primary winding 121, and provides a phase current sense signal Is_ph1 to the phase current sensing terminal CS1 of the controller 300B. The phase current sense circuit 26-2 is coupled to the switch node terminal Vsw2 and the output voltage terminal Vo_p2 of the primary winding 122, and provides a phase current sense signal Is_ph2 to the phase current sensing terminal CS2 of the controller 300B. The phase current sense circuit 26-*n* is coupled to the switch node terminal Vswn and the output voltage terminal Vo_pn of the primary winding 12*n*, and provides a phase current sense signal Is_phn to the phase current sensing terminal CSn of the controller 300B. In one embodiment, the correction circuit 23 is further coupled to each of the phase current sense circuits 26-1, 26-2, . . . , and 26-*n*, and is configured to correct a sensing result of each of the phase current sense circuits 26-1, 26-2, . . . , and 26-*n* in response to the transient condition of the output current Io. Thus, the sensing result of each of the phase current sense circuits 26-1, 26-2, . . . , and 26-*n* can accurately reflect the current flowing through the corresponding switching circuit for both the transient condition and the steady state of the output current Io.

Figure 9:
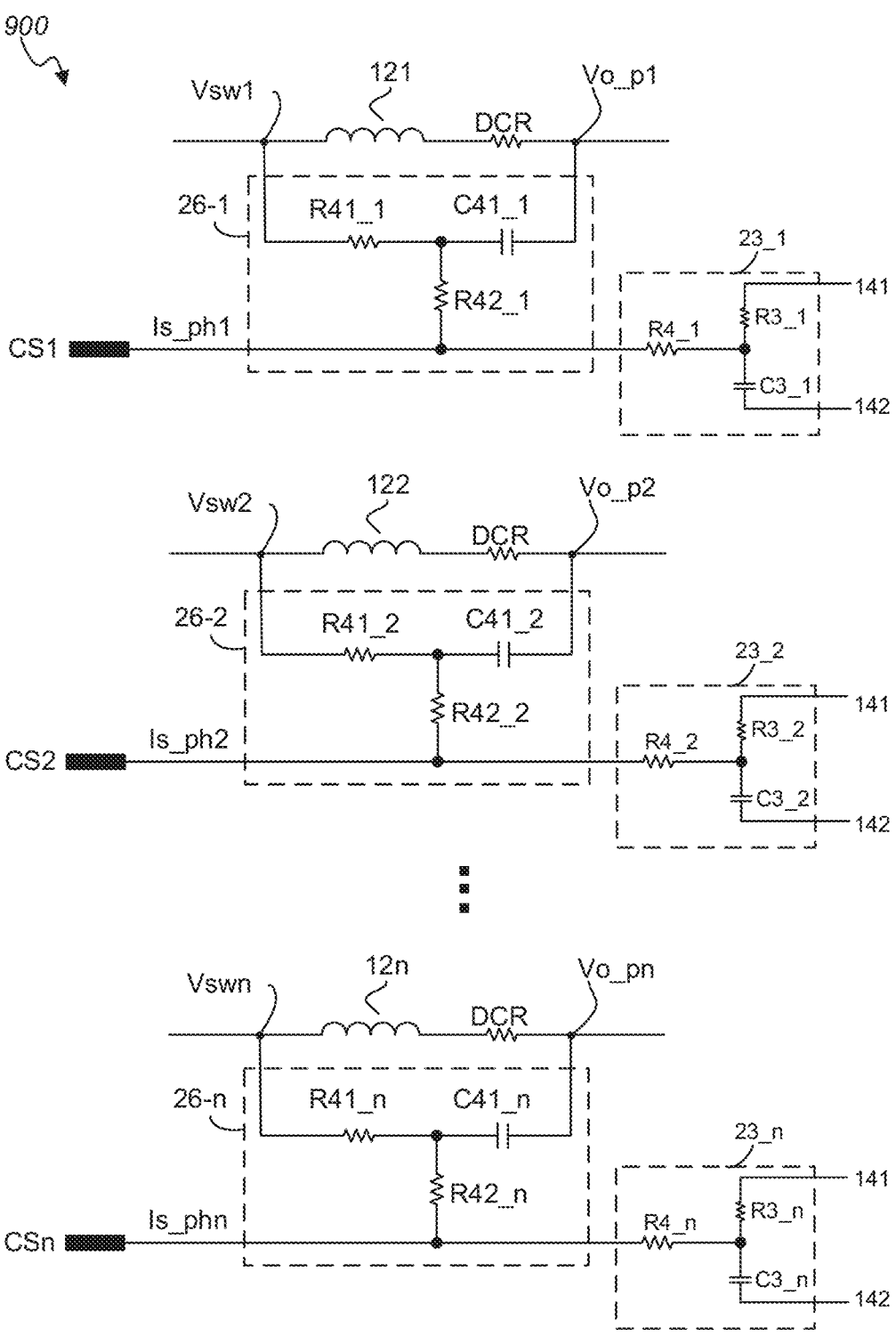
FIG. 9 schematically shows circuit diagrams 900 of a plurality of phase current sense circuits in accordance with an embodiment of the present invention.

FIG. 9 schematically shows circuit diagrams 900 of the plurality of phase current sense circuits 26-1, 26-2, . . . , and 26-*n* in accordance with an embodiment of the present invention. As shown in FIG. 9, for example, the phase current sense circuit 26-1 comprises a resistor R41_1, a capacitor C41_1, and a resistor R42_1. The resistor R41_1 has one end coupled to the switch node terminal Vsw1 of the primary winding 121, and has another end coupled to one end of the capacitor C41_1. Another end of the capacitor C41_1 is coupled to the output voltage terminal Vo_p1 of the primary winding 121. The resistor R42_1 has one end coupled to a common node of the resistor R41_1 and the capacitor C41_1, and has another end coupled to the phase current sensing terminal CS1 of the controller 300B to provide the phase current signal Is_ph1. In one embodiment, the correction circuit 23 further comprises a sub-correction circuit 23_1 to correct the sensing result of the phase current sense circuit 26-1 in the transient condition of the output current Io. In one embodiment, when the output current Io is stable, the sub-correction circuit 23_1 does not correct the sensing result of the phase current sense circuit 26-1. In the example of FIG. 9, the sub-correction circuit 23_1 comprises a resistor R3_1, a correction capacitor C3_1, and a resistor R4_1. The resistor R3_1 has one end coupled to the compensation voltage terminal 141 of the compensation inductor Lc, and has another end coupled to one end of the correction capacitor C3_1. Another end of the correction capacitor C3_1 is coupled to the reference terminal 142 of the compensation inductor Lc. The resistor R4_1 has one end coupled to a common node of the resistor R3_1 and the correction capacitor C3_1, and has another end coupled to the phase current sensing terminal CS1. Circuit structures of the phase current sense circuits 26-2-26-*n* are similar to the circuit structure of the phase current sense circuit 26-1, and are not described here for brevity.

Figure 10:
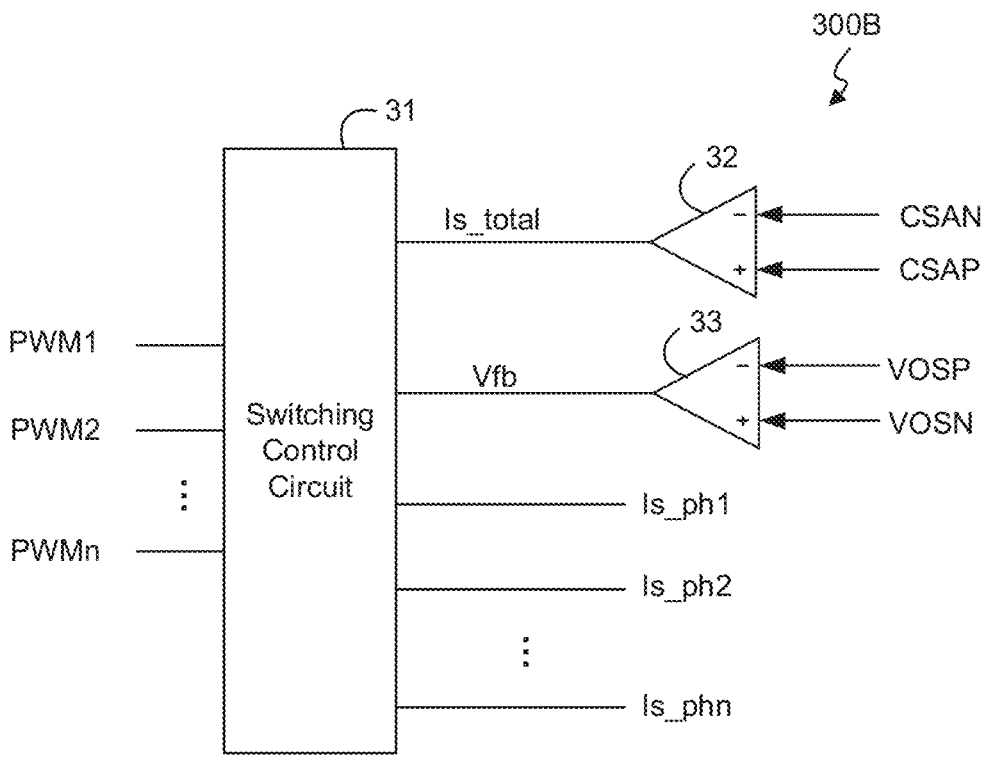
FIG. 10 schematically shows a circuit diagram of a controller 300B in accordance with an embodiment of the present invention.

FIG. 10 schematically shows a circuit diagram of the controller 300B in accordance with an embodiment of the present invention. The controller 300B comprises the switching control circuit 31, the processing circuit 32 and the processing circuit 33. In the example of FIG. 10, the switching control circuit 31 provides the plurality of pulse width modulation signals PWM1, PWM2, . . . , and PWMn based on the total current sense signal Is_total, the voltage feedback signal Vfb, and the phase current signals Is_ph1, Is_ph2, . . . , and Is_phn.

FIG. 11 illustrates a control method 1100 for a multiphase power supply in accordance with an embodiment of the present invention. The multiphase power supply comprises a plurality of transformers and a plurality of switching circuits. Each of the plurality of transformers has a primary winding and a secondary winding. The secondary windings of the plurality of transformers are coupled in series with a compensation inductor. Each of the plurality of switching circuits is coupled to an output voltage of the multiphase power supply. Each of the primary windings has an output voltage terminal coupled to the output voltage and a switch node terminal coupled to a corresponding switching circuit. The control method 1100 comprises steps S11-S14.

In step S11, sensing an average current flowing through the plurality of switching circuits via an average current sense circuit.

In step S12, in response to a transient condition of an output current of the multiphase power supply, using a correction circuit to correct a sensing result of the average current sense circuit based on a current flowing through the compensation inductor. When the output current becomes stable, the correction circuit stops correcting the sensing result of the average current sense circuit.

In step S13, generating a total current sense signal based on the corrected sensing result of the average current sense circuit.

In step S14, generating a plurality of pulse width modulation signals based on the output voltage and the total current sense signal to control the plurality of switching circuits.

In one embodiment, the average current sense circuit comprises at least an average sensing capacitor, and the sensing result of the average current sense circuit is provided across the average sensing capacitor. In one embodiment, the correction circuit comprises at least a correction capacitor, and the correction capacitor is used to correct the sensing result of the average current sense circuit. The correction circuit corrects the sensing result of the average current sense circuit via the correction capacitor.

FIG. 12 illustrates a control method 1200 for the multiphase power supply in accordance with an embodiment of the present invention. The control method 1200 comprises steps S21-S26.

In step S21, sensing the average current flowing through the plurality of switching circuits via an average current sense circuit.

In step S22, in response to the transient condition of the output current of the multiphase power supply, using the correction circuit to correct the sensing result of the average current sense circuit based on the current flowing through the compensation inductor. When the output current becomes stable, the correction circuit stops correcting the sensing result of the average current sense circuit.

In step S23, generating the total current sense signal based on the corrected sensing result of the average current sense circuit.

In step S24, sensing a plurality of currents respectively flowing through the plurality of switching circuits by respectively coupling a plurality of phase current sense circuits to the primary windings of the plurality of transformers.

In step 25, in response to the transient condition of the output current, using the correction circuit to correct sensing results of the plurality of phase current sense circuits based on the current flowing through the compensation inductor, and generating a plurality of phase current sense signals. When the output current becomes stable, the correction circuit stops correcting the sensing results of the plurality of phase current sense circuits.

In step S26, generating the plurality of pulse width modulation signals based on the output voltage, the total current sense signal, and the plurality of phase current sense signals to control the plurality of switching circuits.

Note that in the control methods described above, the functions indicated in the boxes can also occur in different orders than those shown in FIG. 11 and FIG. 12. For example, two boxes presented one after another can actually be executed essentially at the same time, or sometimes in reverse order, depending on the specific functionality involved.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A control circuit for a multiphase power supply with a plurality of transformers and a compensation inductor coupled in series with secondary windings of the transformers, the control circuit comprising:

a controller having a first current sense terminal, a second current sense terminal, and a plurality of switching control terminals, wherein based on an output voltage of the multiphase power supply and a signal between the first current sense terminal and the second current sense terminal, the controller is configured to provide a plurality of pulse width modulation signals respectively at the plurality of switching control terminals to control a plurality of switching circuits of the multiphase power supply;

an average current sense circuit configured to be coupled to a primary winding of each of the plurality of transformers to sense an average current flowing through the plurality of switching circuits, wherein the average current sense circuit comprises an average sensing capacitor with a first end coupled to the first current sense terminal and a second end coupled to the second current sense terminal; and a correction circuit configured to be coupled to the compensation inductor, wherein the correction circuit comprises a correction capacitor with a first end configured to be coupled to a first end of the compensation inductor and a second end coupled to the second current sense terminal, and wherein the correction circuit is configured to inject information obtained from the compensation inductor into the second current sense terminal in response to a transient condition of an output current of the multiphase power supply.

2. The control circuit of claim 1, wherein the average current sense circuit further comprises:

a plurality of first resistors, wherein each of the plurality of first resistors has an end coupled to the first end of the average sensing capacitor, and has another end configured to be coupled a first terminal of the primary winding of a corresponding transformer; and a plurality of second resistors, wherein each of the plurality of second resistors has an end coupled to the second end of the average sensing capacitor, and has another end coupled to a second terminal of the primary winding of the corresponding transformer.

3. The control circuit of claim 1, wherein the correction circuit further comprises:

a third resistor, wherein the first end of the correction capacitor is configured to be coupled to the first end of the compensation inductor via the third resistor.

4. The control circuit of claim 1, wherein the correction circuit further comprises:

a fourth resistor, having an end configured to be coupled to the second end of the compensation inductor and another end coupled to the second end of the correction capacitor.

5. The control circuit of claim 1, wherein the second end of the average sensing capacitor is coupled to the second current sense terminal via a fifth resistor, and the second end of the correction capacitor is coupled to the second current sense terminal via a sixth resistor.

6. The control circuit of claim 1, further comprising:

a plurality of phase current sense circuits, wherein each of the plurality of phase current sense circuits is configured to be coupled to the primary winding of the corresponding transformer and is configured to provide a plurality of phase current sense signals to the controller; wherein the correction circuit is further coupled to each of the plurality of phase current sense circuits, and is further configured to correct at least one of the plurality of phase current signals in response to the transient condition of the output current.

7. The control circuit of claim 1, wherein:

each of the plurality of switching circuits comprises a high side switch and a low side switch controlled by a corresponding pulse width modulation signal, each of the high side switch and the low side switch having a first end and a second end, the first end of the high side switch is coupled to the input terminal of the multiphase power supply, the second end of the high side switch is coupled to the first end of the low side switch to form a switch node coupled to the second terminal of a corresponding primary winding; and wherein the first terminal of the primary winding of each of the plurality of transformers is coupled to the output voltage, and the second terminal of the primary winding of each of the plurality of transformers is coupled to the switch node of the corresponding primary winding.

8. A multiphase power supply, comprising:

an input terminal configured to receive an input voltage;

an output terminal configured to provide an output voltage;

a plurality of transformers, wherein secondary windings of the plurality of transformers are coupled in series with a compensation inductor;

a plurality of switching circuits coupled in parallel between the input terminal and the output terminal of the multiphase power supply, each of the plurality of switching circuits is coupled to the output terminal of the multiphase power supply via a primary winding of a corresponding transformer; and a control circuit, configured to sense an average current flowing through the plurality of switching circuits and a current flowing through the compensation inductor respectively, and is further configured to provide a plurality of pulse width modulation signals to control the plurality of switching circuits; wherein the control circuit is further configured to correct a sensing result of the average current flowing through the plurality of switching circuits based on the current flowing through the compensation inductor, and to provide the plurality of pulse width modulation signals based on the output voltage and the corrected sensing result of the average current flowing through the plurality of switching circuits.

9. The multiphase power supply of claim 8, wherein the control circuit comprises:

a controller having a first current sense terminal, a second current sense terminal, and a plurality of switching control terminals, wherein the controller is configured to provide the plurality of pulse width modulation signals at the plurality of switching control terminals based on the output voltage of the multiphase power supply and a signal between the first current sense terminal and the second current sense terminal;

an average current sense circuit coupled to the primary winding of each of the plurality of transformers to sense an average current flowing through the plurality of switching circuits, wherein the average current sense circuit comprises an average sensing capacitor with a first end coupled to the first current sense terminal and a second end coupled to the second current sense terminal; and a correction circuit coupled to the compensation inductor, wherein the correction circuit comprises a correction capacitor with a first end coupled to a first end of the compensation inductor and a second end coupled to the second current sense terminal, and wherein the correction circuit is configured to correct the sensing result provided by the average current sense circuit based on the current flowing through the compensation inductor.

10. The multiphase power supply of claim 9, wherein the average current sense circuit further comprises:

a plurality of first resistors, wherein each of the plurality of first resistors has an end coupled to the first end of the average sensing capacitor, and has another end coupled to the output voltage of the multiphase power supply via a terminal of the primary winding of the corresponding transformer; and a plurality of second resistors, wherein each of the plurality of second resistors has an end coupled to the second end of the average sensing capacitor, and has another end coupled to a corresponding switch node via another terminal of the primary winding of the corresponding transformer.

11. The multiphase power supply of claim 9, wherein the correction circuit further comprises:

a third resistor, wherein the first end of the correction capacitor is coupled to the first end of the compensation inductor via the third resistor.

12. The multiphase power supply of claim 9, wherein the correction circuit further comprises:

a fourth resistor, having an end coupled to the second end of the compensation inductor and another end coupled to the second end of the correction capacitor.

13. The multiphase power supply of claim 9, wherein the second end of the average sensing capacitor is coupled to the second current sense terminal via a fifth resistor, and the second end of the correction capacitor is coupled to the second current sense terminal via a sixth resistor.

14. The multiphase power supply of claim 8, wherein:

the control circuit is further configured to correct sensing results of a plurality of currents, wherein each of the plurality of currents is capable of flowing through one of the plurality of switching circuits; and wherein the control circuit is configured to provide the plurality of pulse width modulation signals further based on the corrected sensing results of the plurality of currents.

15. The multiphase power supply of claim 9, wherein the control circuit further comprises:

a plurality of phase current sense circuits, wherein each of the plurality of phase current sense circuits is coupled to the primary winding of the corresponding transformer and is configured to provide a plurality of phase current sense signals to the controller; wherein the correction circuit is further coupled to each of the plurality of phase current sense circuits to correct at least one of the plurality of phase current signals in response to the transient condition of the output current of the multiphase power supply.

16. The multiphase power supply of claim 8, wherein each of the plurality of switching circuits comprises a high side switch and a low side switch, each of the high side switch and the low side switch having a first end and a second end, the first end of the high side switch is coupled to the input terminal of the multiphase power supply, the second end of the high side switch is coupled to the first end of the low side switch to form a switch node, and the second end of the low side switch is coupled to a reference ground, and wherein the high side switch and the lower side switch are controlled by a corresponding pulse width modulation signal.

17. A control method for a multiphase power supply, wherein the multiphase power supply comprises a plurality of transformers and a compensation inductor coupled in series with secondary windings of the transformers, the control method comprising:

sensing an average current flowing through a plurality of switching circuits of the multiphase power supply via an average current sense circuit;

in response to a transient condition of an output current of the multiphase power supply, using a correction circuit to correct a sensing result of the average current sense circuit based on a current flowing through the compensation inductor;

generating a total current sense signal based on the corrected sensing result of the average current sense circuit; and generating a plurality of pulse width modulation signals based on the output voltage and the total current sense signal to control the plurality of switching circuits.

18. The control method of claim 17, further comprising:

sensing a plurality of currents respectively flowing through the plurality of switching circuits by respectively coupling a plurality of phase current sense circuits to primary windings of the plurality of transformers;

generating a plurality of phase current sense signals based on the plurality of currents and the current flowing through the compensation inductor, wherein the plurality of phase current sense signals are corrected by the current flowing through the compensation inductor in response to the transient condition of the output current; and generating the plurality of pulse width modulation signals further based on the plurality of phase current sense signals.

19. The control method of claim 17, wherein the correction circuit comprises a correction capacitor and a first resistor, and wherein using the correction circuit to correct the sensing result of the average current sense circuit based on the current flowing through the compensation inductor further comprises:

coupling a first end of the correction capacitor to the compensation inductor via the first resistor; and proving information obtained from the compensation inductor at a second end of the correction capacitor to correct the sensing result of the average current sense circuit.

20. The control method of claim 17, wherein the correction circuit comprises a correction capacitor and a second resistor, and wherein using the correction circuit to correct the sensing result of the average current sense circuit based on the current flowing through the compensation inductor further comprises:

coupling the correction capacitor and the second resistor in series between two ends of the compensation inductor; and proving information obtained from the compensation inductor at a common node of the correction capacitor and the second resistor to correct the sensing result of the average current sense circuit.

* * * * *